United States Patent
Cohen

(10) Patent No.: US 11,430,024 B2
(45) Date of Patent: Aug. 30, 2022

(54) SYSTEM AND METHOD OF PROVIDING A VIRTUAL GUESTBOOK

(71) Applicant: Amos M. Cohen, Brooklyn, NY (US)

(72) Inventor: Amos M. Cohen, Brooklyn, NY (US)

( * ) Notice: Subject to any disclaimer, the term of this patent is extended or adjusted under 35 U.S.C. 154(b) by 173 days.

(21) Appl. No.: 14/477,611

(22) Filed: Sep. 4, 2014

(65) Prior Publication Data

US 2015/0066807 A1 Mar. 5, 2015

Related U.S. Application Data

(60) Provisional application No. 61/873,608, filed on Sep. 4, 2013.

(51) Int. Cl.
   *G06Q 30/02*   (2012.01)
(52) U.S. Cl.
   CPC .................. *G06Q 30/0282* (2013.01)
(58) Field of Classification Search
   CPC .................................................. G06Q 30/0282
   See application file for complete search history.

(56) References Cited

U.S. PATENT DOCUMENTS

| 1,028,921 A | 6/1912 | Wagner | |
| 6,026,387 A * | 2/2000 | Kesel | G06Q 30/02 706/45 |
| D674,437 S | 1/2013 | Siegel | |
| 8,370,577 B2 | 2/2013 | Sheaffer et al. | |
| 2004/0172323 A1* | 9/2004 | Stamm | G06Q 30/02 705/7.32 |
| 2005/0028005 A1* | 2/2005 | Carson | G06Q 10/10 726/5 |

(Continued)

FOREIGN PATENT DOCUMENTS

| CN | 1422411 A * | 6/2003 | ............ G06Q 30/02 |
| EP | 1645976 | 4/2006 | |

(Continued)

OTHER PUBLICATIONS ip.iq.com search. (Year: 2021).*

(Continued)

*Primary Examiner* — Tan D Nguyen
(74) *Attorney, Agent, or Firm* — FisherBroyles, LLP; Ariel Reinitz

(57) ABSTRACT

A system and method are disclosed for accessing, by a computing device, a database that includes: business information representing a plurality of respective businesses that sell products and/or services to customers and customer information representing a plurality of respective customers, that purchase the products and feedback information representing submissions from the respective customers regarding experiences of the customers in connection with the respective businesses. Information associated with a sale of a product and/or service is processed including to associate a code with the sale. The customer is prompted to submit feedback information associated with the business and/or the sale of the product and/or service, and the feedback information is processed to store the feedback in the database and to provide the feedback information in a virtual guestbook associated with the business.

18 Claims, 4 Drawing Sheets

(56) References Cited

U.S. PATENT DOCUMENTS

| | | | |
|---|---|---|---|
| 2005/0228593 A1* | 10/2005 | Jones | G06Q 10/10 |
| | | | 702/19 |
| 2008/0276176 A1 | 11/2008 | Wahba et al. | |
| 2009/0070228 A1* | 3/2009 | Ronen | G06Q 30/0603 |
| | | | 705/26.1 |
| 2009/0112683 A1* | 4/2009 | Hamilton, II | G06Q 30/02 |
| | | | 705/7.32 |
| 2009/0119258 A1 | 5/2009 | Petty | |
| 2010/0028416 A1* | 2/2010 | Yu | A61K 47/10 |
| | | | 424/450 |
| 2011/0004477 A1* | 1/2011 | Bansal | H04N 5/781 |
| | | | 704/275 |
| 2011/0082746 A1* | 4/2011 | Rice | G06Q 30/02 |
| | | | 705/14.56 |
| 2013/0055354 A1 | 2/2013 | Weinberg et al. | |
| 2013/0173402 A1* | 7/2013 | Young | G06Q 30/0635 |
| | | | 705/14.73 |
| 2014/0019199 A1* | 1/2014 | Appel | G06Q 30/00 |
| | | | 705/7.29 |
| 2014/0143157 A1* | 5/2014 | Jeffs | G06Q 30/016 |
| | | | 705/304 |
| 2014/0278783 A1* | 9/2014 | Du | G06Q 30/0203 |
| | | | 705/7.32 |

FOREIGN PATENT DOCUMENTS

| | | | | |
|---|---|---|---|---|
| KR | 2006012854 A | * | 9/2004 | |
| WO | WO-0124576 A1 | * | 4/2001 | H04M 3/42 |
| WO | WO-2008138142 A1 | * | 11/2008 | G06Q 20/204 |
| WO | WO 13/116901 | | 8/2013 | |

OTHER PUBLICATIONS ip.iq.com NPL search. (Year: 2021).*

Dey, L, "Mining Customer Feedback for Actionable Intelligence", Aug. 1, 2010, 2010 IEE/WIC/ACM, International Conference on Web Intelligence and Intelligent Agent Tech., vol. 3, pp. 239-242, abstract only. (Year: 2010).*

Dialog search. (Year: 2021).*

Kuriyan, Renee, "Review of Research on Rural PC Kiosks", 2007, Research Microsoft, pp. 1-22. (Year: 2007).*

S.C. Hui, "Data Mining for Customer Service Support", Information & Management 38 (2000), pp. 1-13. (Year: 2000).*

Wan Yina, "Application of Customer Relationship Management in Health Care", 2010 Second International Conference on MultiMedia and Information Technology, pp. 52-55. (Year: 2010).*

* cited by examiner

SYSTEM AND METHOD OF PROVIDING A VIRTUAL GUESTBOOK

CROSS-REFERENCE TO RELATED APPLICATIONS

This application is based on and claims priority to U.S. Provisional Patent Application Ser. No. 61/873,608, filed Sep. 4, 2013, and further is related to U.S. patent application Ser. No. 29/468,625, filed Oct. 1, 2013, the entire contents of both of which are hereby incorporated by reference in their respective entireties.

FIELD

The present application relates, generally, to networking and, more particularly, to a system and method for providing virtual guestbook services.

BACKGROUND

Businesses operating in today's world of commerce and the Internet strive to receive feedback and reviews from customers. Such feedback can be crucial for business success. Moreover, increased loyalty associated with online communities represents opportunities for businesses, such as to engage users and enjoy repeat business. Unfortunately, there has not been an effective integration of managing feedback from customers with marketing (e.g., viral marketing) in accordance with modern technology.

SUMMARY

The present application provides systems and methods for customers to post and review input associated with their experiences in a virtual guestbook.

In one or more implementations, a system and method are provided that include accessing, by a computing device, a database that includes electronic business information, electronic customer information and electronic feedback information. The electronic business information can represent a plurality of respective businesses that sell products and/or services to customers. The electronic customer information can represent a plurality of respective customers that purchase the products and/or services from the respective businesses. Further the electronic feedback information can represent submissions from the respective customers regarding experiences of the customers in connection with the respective businesses.

Information associated with a sale of a product and/or service from one of the respective businesses to a customer is processed, by the computing device, including to associate a code with the sale. The customer is prompted, by the computing device, to submit feedback information associated with the business and/or the sale of the product and/or service. The feedback information received in response to the prompt is processed, including to store the feedback in the database and to provide the feedback information in at least a virtual guestbook associated with the business.

It is to be understood that both the foregoing general description and the following detailed description of the present invention are exemplary and explanatory and are intended to provide further explanation of the invention as claimed.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION

Figure 1:
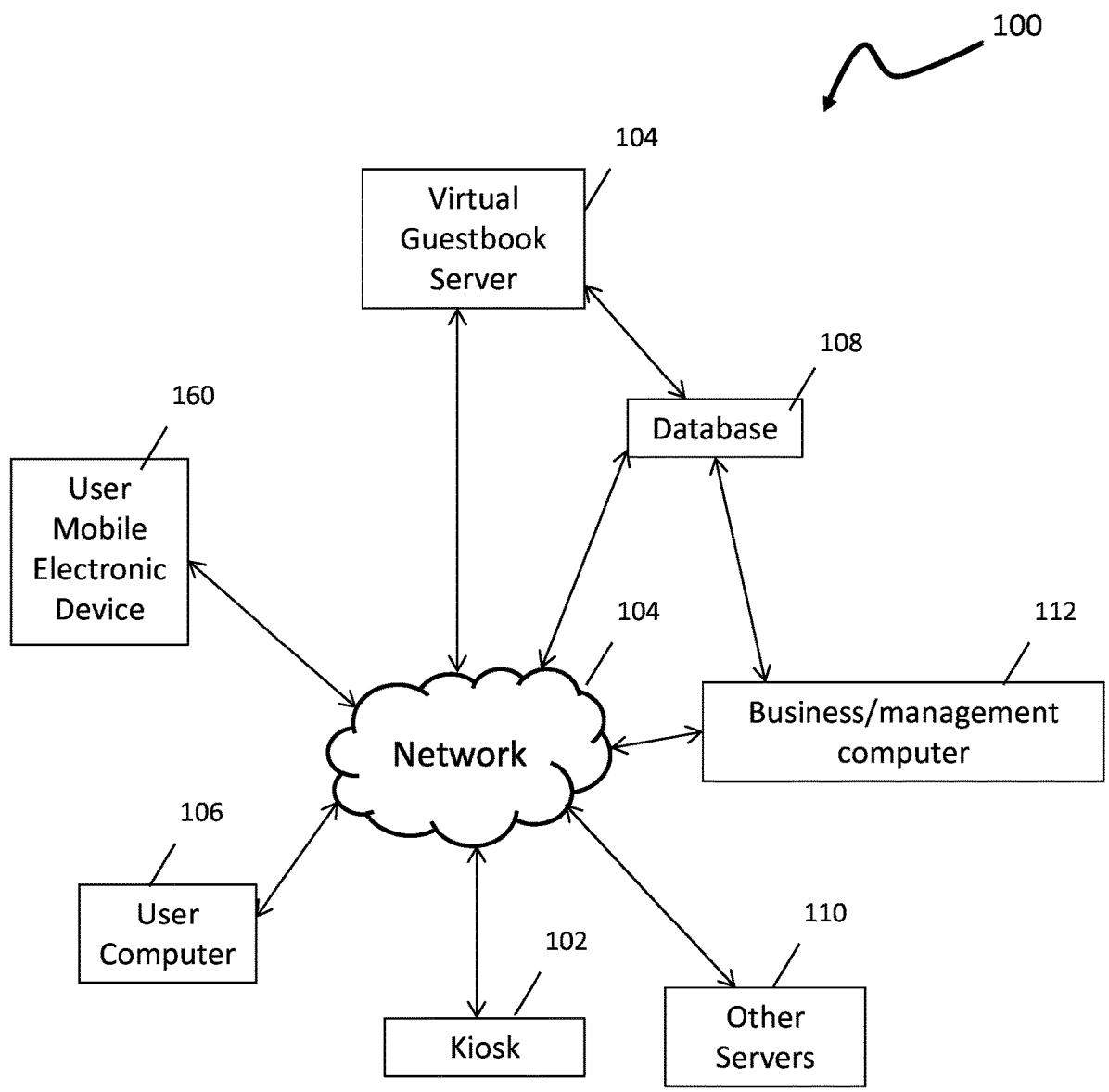
FIG. 1 shows an example hardware arrangement of computing devices arranged to send and receive information in accordance with an implementation.

Referring now to the block diagram shown in FIG. 1, a system 100 is illustrated and that is configured to provide functionality associated with a virtual guestbook. In one or more implementations, the system can include a kiosk 102 (or other terminal or device), which can be placed in or near a business, and which encourages visitors (or "guests") to the business to submit information, such as feedback regarding the business. The kiosk 102 can be configured in various ways, such as a standalone computer, or as a terminal-ready device that connects to a server computing device 104 having a processor and memory over a wired and/or wireless network 105. The kiosk 102 can be configured with one or more cameras and/or microphones for receiving live input (e.g., testimonials) from users. Using a kiosk 102, a user can interact while (s)he is located at a business's premises, which improves engagement with the user including by providing a direct contact with the user by the business. The kiosk 102 and/or server computing device 104 can manage information, such as guest comments, that is submitted by users. Input from users can be integrated with a business's customer relationship management ("CRM") and/or enterprise resource planning ("ERP") software application(s), for improved information management. This can allow customer care to be tailored to actual feedback and promotions. Further, as a plurality of businesses implement the teachings herein, cross-business promotions can be supported, such as via searchable business directories, listings, hours and/or locations. The system 100 can also include computers and/or mobile devices 106, from which users can also connect to the server 104 and submit information, such as feedback, regarding a business. In one or more implementations, the server 104 can manage a plurality of kiosks 102 and/or computing devices 106 for a plurality of businesses, and can be connected to one or more databases 108 for maintaining, storing and retrieving information associated therewith. Furthermore, the server 104 can be connected to one or more other servers 110, where information can be sent and received, e.g., to a social media site or an e-mail server, as will be explained in further detail below.

During or after the time when a guest visits a business, one or more prompts is provided to the guest to submit feedback in a form of a virtual guestbook regarding the guest's experience with the business. In some implementations, the guest (user) uses a kiosk 102 at the location of the business to access the virtual guestbook. Alternatively, the guest accesses a computing device 104 using a user computing device 106 remotely over a network 105 connection, in order to be provided access to the virtual guestbook. User input can be provided through a user interface, such as in response to prompts, which may include text box controls and other graphical input controls, such as for manipulating a virtual sliding bar or other virtual representation of a rating level. Other user input can be provided as a function of a video or voice recording, as an image, and/or other suitable format.

In one or more implementations, users submit authorization information to verify their respective credibility, which may be based on a unique code or other information provided by the business management, including via a business management computing device 112. After user input (e.g., feedback regarding a business) has been received, the server 104 providing access to the virtual guestbook can be configured to calculate a quality score associated with the user input. The quality score can be used, for example, to determine whether other users can view a particular user's feedback, such as whether a user's input user can be shared publicly, or whether access to a user's input should be restricted (e.g., for a business owner and/or employees only). Quality scores can further be used to determine whether user input should be restricted to displays in certain locations (e.g., at a kiosk 102 located at a business, on a particular advertisement display, or the like). Quality scores can further be used to determine whether user input should be publicly displayed, such as shared over the Internet on social media sites, in an e-mail blast, or the like.

Figure 2:
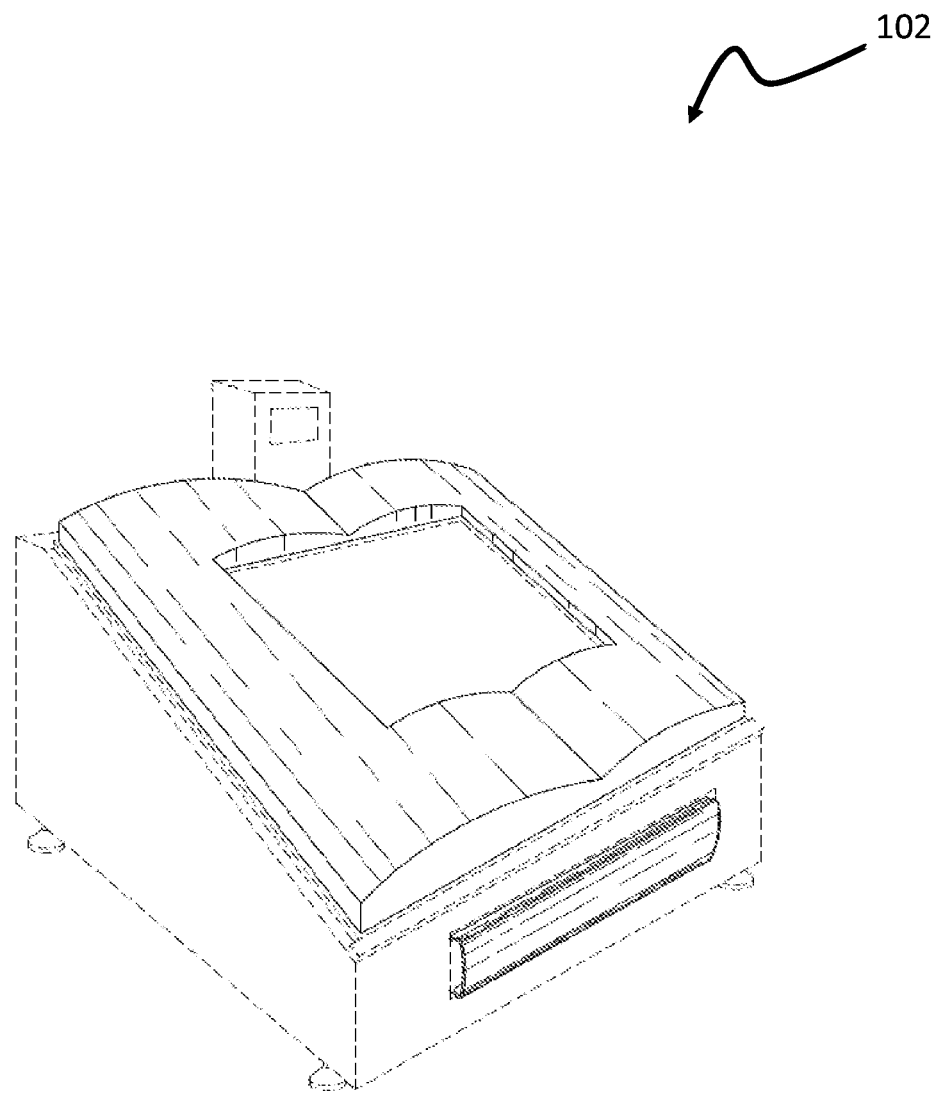
FIG. 2 is a perspective view of an example kiosk, in accordance with an implementation.

FIG. 2 is a perspective view of an example kiosk 102, in accordance with an implementation.

In one or more implementations, a quality score associated with information received from a user in a virtual guestbook can be based on various parameters. Example parameters can include, for example: an evaluation of words and phrases used to describe the experience of the user; a rating level provided by the user for each of the service and quality of aspects of the business and/or the business as a whole; or the industry type of the business (e.g., retailer, hotel chain, restaurant) which, in one or more implementations, can be used to compare the results of the first two parameters with other businesses in the same or similar industry.

It is recognized by the inventor that customer expectations for service and quality may differ from industry to industry, and the types of words and phrases used to describe the experience of a user, as well as relative values associated with such words and phrases, can similarly differ between industries. For example, for industry A an acceptable service and quality rating may be a 70% rating, while for industry B an acceptable service and quality rating may be a 85% rating. Therefore, it may be inappropriate to compare just the numeric value of the two ratings because both ratings may be considered high overall ratings for their respective industries. Accordingly, one or more additional parameters, such as that can be used for weighting, can be factored into the determination of a quality score. Moreover, the present application permits business owners to exercise some control whether a given user's input should be published based on the quality score relative to the industry or other factors associated with the business to which the user input relates.

The present application provides users with increased access to accurate feedback information from other users in connection with one or more businesses or establishments. In accordance with the technological configurations of the present application, such as shown and described herein, users can be afforded information that is particularly accurate and reliable, which contributes to the relative success of one or more businesses. For example, a guest submits feedback associated with a business that specifies that, for the prices charged by the business, the quality of service is excellent. As other users frequent the business, they confirm in the virtual guestbook that the feedback posted by the guest is accurate. As this occurs over time (including with multiple guests), credibility of individual guests and of the platform as a whole increases. Guest postings can be confirmed (or rejected), which increases the likelihood of future posts by one or more of the same guests to be accurate. This enables searchers and other users to rely upon system 100 for accuracy and reliability in connection with business-related information.

Moreover, the present application includes functionality for which one or more actions can be taken in connection with a calculated quality score that is associated with user input. User input that has an associated quality score that falls below a predefined threshold or within a predefined range can be automatically flagged for various actions to occur. For example, such user input can be transmitted automatically to a customer care representative of a respective business for further review and evaluation, prior to the user input being published. This provides a business with an opportunity to resolve any issues associated with the input and/or quality score with the customer.

In one or more implementations, a guest may be prompted to provide a vocalized (speech) response to a survey question. Alternatively, a user may be prompted to supply a recorded video or audio clip, so that data can be extracted. Such audio and/or video responses can be provided in addition to or in lieu of other forms of user input, such as textual input that a user types, selections or other manipulations of graphical screen controls (e.g., dials, lists, radio buttons or the like). Responses that are received can be processed, including to convert to text. In one or more implementations, a natural language processing (NLP) algorithm is used to establish an expected response signal which can include interim operations before an expected response signal is established. Operations performed in the interim by a natural language processing algorithm can be based on statistical machine learning in which a learning algorithm is based, such as statistical inference, and used to automatically learn rules through the analysis of large textual corpora of examples. An annotated corpora includes part-of-speech tagging in which information about each word's respective part of speech (e.g., verb, noun, adjective, or the like) is added to the corpus in the form of tags or the lemma (base) of each word. The automatically learned rules can then be applied to the inputted features included in the text of the responses of guests and digital data provided to the processor. Such rules, as understood in the art of NLP, apply statistical models which make probabilistic decisions based on real-valued weights that are associated with each input feature. Statistical models of this type can express the relative certainty of different possible answers rather than only one, and thereby produce more reliable results. As such, the interim operations in such implementations provide weightings to a set of probabilistic decisions so that those decisions that have the highest weightings are selected for the determination as to an aspect of the relative satisfaction of the guest, with the expected response signal being established based on those decisions. A single decision with the highest rating can be selected, or the results with the highest statistical likelihood of pertinence can then be compared to a rule base for a match within a prescribed criterion (or criteria) in order to establish the expected response signal.

In one or more implementations, feedback that represents a rating of a business's service and quality is received from user, for example, in response to the user selecting a value in a graphical user interface that includes a sliding bar and at a level or location along the bar that corresponds to the user's opinion. In such example implementation, values in the sliding bar can represent, for example, percentages (0%-100%) or other numerical or textual scale (1-10, "excellent/good/fair/poor"), which correspond to respective perceived levels of service and quality. A quality score can be calculated by averaging the levels provided by the user for each of a plurality of service and quality. If the user provides feedback using a combination of inputs (e.g., sliding bar level(s)) and a description (verbal, text or other), the bar average and the description evaluation can be averaged or otherwise given weights which, when combined, constitute a quality score. Finally, the quality score can be further weighted or otherwise assessed based on the industry to provide an altered or final quality score.

Regardless of the user's input method, once the server computing device 104 or other computing device 104, 106 determines a quality score for the user input, a broadcast level can be determined that is based on the quality score. In one or more implementations, the broadcast level indicates the extent to which the user input (e.g., feedback) will be broadcast to others and/or who will be able to view the user input. Thus, the broadcast level can indicate whether to make user input available for all users (regardless of location or other criteria), make user input available only for guests located at a business's premises, make user input available remotely, e.g., for "premium" users and based on the users' access level permission and/or the users' credibility/credentials, or whether user input should be referred first to a customer care representative prior to publication, if at all.

The determination of a broadcast level can be made in various ways. For example, user inputs can be divided, initially, between an internal level and a public level. Internal level user inputs can be stored on a virtual guestbook server 104 for internal review, while public level user inputs can be sent to a "bridge" which, in one or more implementations, can be the business's personal server, a smart "blog," or other online medium, such as a business website. The bridge can be uniquely customized for the particular business and/or industry, and each business can have its own bridge and can communicate with the virtual guestbook server 104. The bridge can upload user inputs and statistics to other systems, such as via one or more application programming interfaces ("APIs"), which supports integration with a business's own website (for example, as testimonials to be used on the business home page), social networking outlets, and/or various online platforms such as RSS feeds. Depending on the quality score, access to internal level user inputs can be restricted to only by the business or can be made viewable only to customers visiting the business, for example, at the kiosk 102 or on an associated display.

Kiosk 102 and/or server 104 can be configured to prompt a user to provide feedback anonymously or, alternatively, a user can first be prompted to register to create an account and/or submit login credentials. The login account can be associated with the virtual guestbook server 104 in the form of a general user account, or can be tied to an account that is specific to the business and/or industry. In yet another alternative, a user account may not be associated directly with the virtual guestbook. For example, the user can log in using information associated with his or her e-mail account, social media account, or to an account for a specific industry rating portal, as may be determined by the business. In one or more implementations, user account credentials may only be required in cases where the user desires to have his/her feedback shared publicly. Users may not be prompted to submit any login information for feedback that is provided and/or restricted only directly with business management, such as in connection with anonymous entry in a kiosk 102 that is located on the business's premises.

In one or more implementations users can be assigned a unique code, such as by server 104. The code can be associated with a specific business, a specific user (e.g., if the user is logged in), and a time stamp of the user's visit (example: ABC-JOE-MAY10). The unique code can also be associated with a promotional offer, which can be used to reference a promotion being offered by the business. Server 104 (as well as kiosk 102 and/or other computing devices 106) can also be configured to associate feedback that the user shares with the user's code for public sharing of the feedback. For example, the user can be provided the option to post a promotional code directly to his or her social media pages to share the experience of the service or product with his/her friends, thereby offering the friends the promotion (such a discount). In addition, a point/reward system can be implemented whereby a user and/or user feedback is ranked and/or points can be collected based on the user feedback, the frequency of the feedback being provided by the user, the number of times feedback/promotions/referrals are shared with friends, or the like. Users can be provided discounts or other compensation based on the ranking or points collected. For example, users who are ranked as having "premium" status can be provided with access to feedback information, promotions, or other benefits publicly (e.g., over the Internet), whereas users who are ranked as "standard" can only view feedback or receive benefits directly from a kiosk 102. Other implementations are supported herein, such as other forms of benefits and promotions to reward users. This encourages return revenue, increases customer loyalty and maintains high-value customer relationships.

In accordance with one or more implementations of the present application, system 100 can be configured to provide a business owner, proprietor, manager or other party associated with a business with the ability to control aspects of the system. For example, a dashboard management system can be provided, wherein an authorized business representative, e.g., a manager, can log in (using a manager account login) to interface with the server 104 and define one or levels of inputs representing feedback that the business representative is comfortable with being broadcast automatically and without prior review by a manager or other business representative. The dashboard can be configured to prompt the business representative with suggested level(s) based on other business owners of the same industry type, as well as other factors, such as how long the business has been operational, the location of the business, the type of business or the like. Additionally, the dashboard can be configured with different levels of access. For example, in some embodiments, employees can be provided with viewing access only, whereas a manager or owner can be provided with edit and/or delete rights for user input as well, for example, to remove an inappropriate or offensive post.

Figure 3:
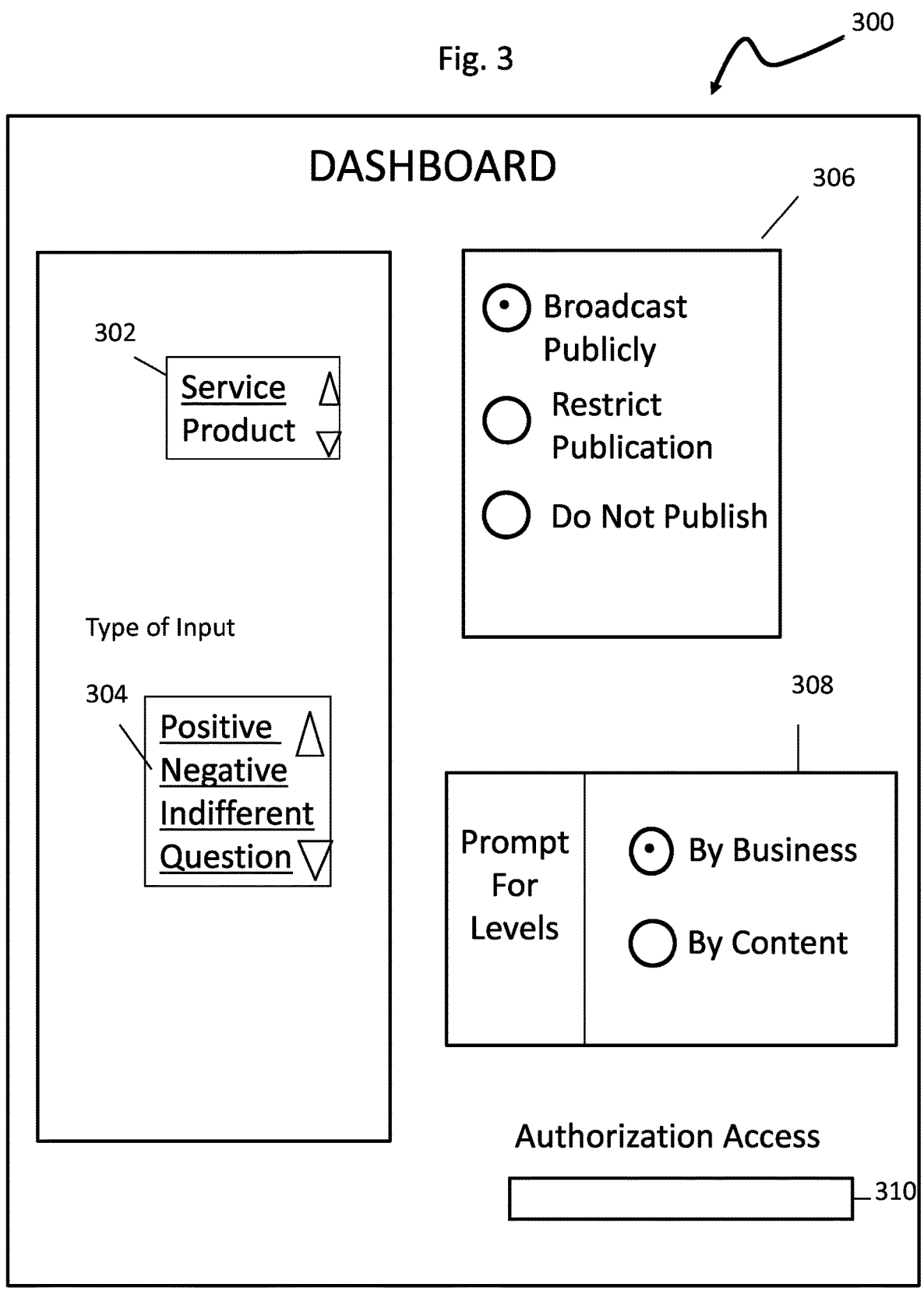
FIG. 3 illustrates example graphical screen controls associated with a dashboard user interface, in accordance with an implementation.

FIG. 3 illustrates example graphical screen controls associated with a dashboard user interface 300, in accordance with an implementation. As shown in FIG. 3, graphical screen controls, such as drop-down lists, radio buttons and text boxes are provided for users to submit information, such as control the kinds of user feedback. Drop-down list 302 provides users with an opportunity to select whether the particular business provides a service or product (or both), input control 304 allows users to define the type of input to be received, such as positive, negative, indifferent, a question or other. Also illustrated in dashboard 300 includes radio buttons section 306 relating to broadcasting, and includes options to broadcast feedback publicly, to restrict publication of feedback and to prevent publication. Levels section 308 includes radio buttons that are provided to prompt the user to define levels by a business or content. Further, suggestions and/or free text may be provided in authorization access control 310. One skilled in the art will recognize that the dashboard interface 300 illustrated in FIG. 3 can be configured in many ways and that the particular dashboard illustrated is merely exemplary.

Figure 4:
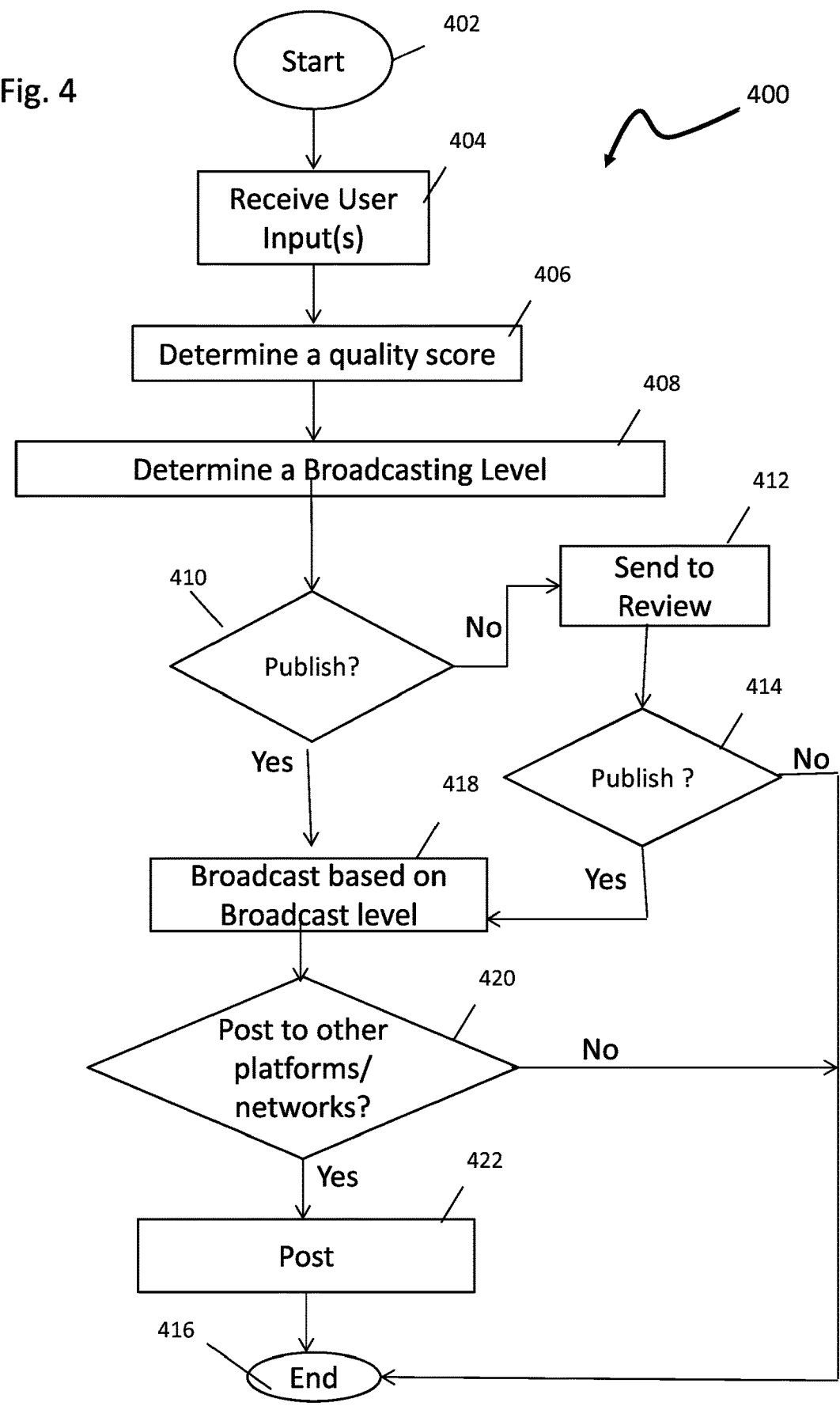
FIG. 4 is a flowchart illustrating example process steps in accordance with an example implementation of the present application.

Turning now to FIG. 4, a flow diagram is described showing a routine 400 that illustrates a broad aspect of a method for providing a virtual guestbook and corresponding functionality in accordance with at least one implementation disclosed herein. It should be appreciated that several of the logical operations described herein are implemented (1) as a sequence of computer implemented acts or program modules running on computing devices 102/104/106 and/or (2) as interconnected machine logic circuits or circuit modules within computing device 102/104/106. The implementation is a matter of choice and can be (though not necessarily) dependent on the requirements of the device (e.g., size, mobility, energy, consumption, performance, etc.). Accordingly, the logical operations described herein are referred to variously as operations, steps, structural devices, acts, or modules. As referenced above, various of these operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Continuing with the flowchart shown in FIG. 4, steps 400 include steps in accordance with one or more implementations for providing a virtual guestbook. At step 402, the process starts, and, thereafter, information from one or more user inputs from a user (guest) is received or collected, and the input(s) are entered into a virtual guestbook locally or remotely (step 404). Thereafter, a step of determining a quality score is performed and that is based, for example, on the user input(s) provided (step 406). At step 408, a step of determining a broadcasting level is conducted for each input before an input is broadcast. For example, the broadcast level can be related to whether to publish internally only, to publish internally and publically, to publish for internal review by a customer care representative, or other considerations. At step 410, a determination is made whether to publish the input(s). The determination made in step 410 can be at least in part as a function of settings defined by the business owner or other business representative. For example, a "bridge" can be used that for broadcasting the information to the business's media outlets or other available online platforms that are connected to the bridge. Such broadcasting can occur automatically or a one-time, manual setup. If the determination in step 410 is not to publish, then the process branches to step 412 and input is sent to the user for review. An offer may be included that gives the user the option to post his or her input on a third-party computing device, such as the user's own social network or industry specific network. As noted herein, "premium" users can be provided with a social platform to browse/search for services or products based on their friends' inputs, and communicate regarding preferences, opinions.

Continuing with reference to the flowchart shown in FIG. 4, after the input is sent to the user for review, another determination is made at step 414 whether to publish, such as to another social platform. If not, then the process branches to step 416 and ends. Alternatively, if the determination at step 410 or step 414 is to publish, then the users input is broadcast (e.g., published) based on the respective broadcast level determined for the user at step 408 (step 418). Thereafter, another determination is made at step 420 whether to post to other platforms and/or networks, in addition to the businesses media outlets, such as kiosk 102 or local advertising display. If not, the process branches to step 416 and ends. Alternatively, if the determination at step 420 is to post to other platforms and/or networks, then at step 422, the input is posted accordingly. Thereafter, the process continues to step 416 and ends.

In one or more implementations, the server 104 that is providing a virtual guestbook can be communicatively connected to one or more display devices (such as standalone advertising monitors, website-based advertising systems, etc.) to act as a point of advertising. Such advertising can be automatically distributed based on one or more of the business/industry details. The server 104 can also be configured to include a message distribution system for sending e-mail blasts to registered users of a specific business. In one or more implementations, the business owner can decide the frequency of e-mail message "blasts" and dictate the content of the e-mail messages.

As stated herein, the server 104 associated with a virtual guestbook can manage a plurality of businesses that operate within a plurality of respective industries. Details of each business can be uploaded to the server 104 by a business representative, by a system manager or other authorized user, and businesses can be categorized based on, for example, Standard Industrial Classification (SIC) and North American Industry Classification System (NAICS) codes that connect with that specific industry type and geographic information. This information can be updated regularly with a connection to list providers and users updates. Access to update business information can also be provided to accredited users only. For example, business owners and/or managers or premium users that gain "accredited" level to enter input/information regarding any business, such as based on their volume of system usage and/or input from other premium users that "like" or approve their inputs overall, are able to update important, critical, and/or sensitive information related to a business. Moreover, the industry classifications can be used by the server 104 or other device 102, 106 in determining a quality score, as shown and described herein.

A benefit provided by the teachings herein include a virtual guestbook system that can limit certain types of access to information, while still giving guests the option to enter their inputs remotely. For example, a virtual guestbook kiosk 102 that is located at or near the premises of a business (e.g., "ABC Corporation") can have a unique uniform resource locator, e.g., www.ABC.genuineguestbook.com, which can only be accessed from preapproved internet protocol ("IP") addresses. For example, only IP addresses that correspond to the business location and the kiosk 102 are authorized to access the site. A second unique URL for the same ABC business can be provided, for example, www.genuineguestbook.com/ABC, to which access can be provided based on respective access levels of various users who provide authentication information (e.g., username and password). Thus, simultaneous forms of restricting access to users are supported by the present application, which can be based on something other than IP address. Some users can access entire virtual guestbook contents based on their respective levels of authorization, e.g., access permissions, while others can only add their own inputs and/or see a discrete number of user inputs, such as the two most recently submitted feedback entries.

The server 104 can also be configured to include a messaging/alert system for owners, managers or other representatives of a business, which can be preconfigured to be provided in response to certain triggers/events. For example, when a user input is determined to have a quality score below a predefined threshold, a manager can be informed via a text message or e-mail. In another example, after a predefined number of "negative" (low quality score) user inputs are received with a predefined period of time, such as three negative reviews within a seven day period, an alert can be transmitted to a manager. In addition to identifying negative user inputs, messages/alerts can be provided in response to positive feedback received from users. Alerts can be formatted in various ways, such as to include specific details that caused the trigger, so that the manager can respond accordingly and expediently.

As noted herein, user access control levels can be used by server 104 to maintain accuracy and legitimacy of input, as well as for indexing of data and ensuring reliability of information. At the lowest access level, for example, all users can access the virtual guestbook at a kiosk 102 that is physically located of the business. Such access may be anonymous, so that users are comfortable submitting accurate and truthful information representing their respective experiences at the business premises. An access level that is higher than the lowest access level, for example, provides users with limited remote access to one or more virtual guestbooks. This level of access may require users to register with server 104, and such a registered user can access a respective virtual guestbook remotely, as if the user were at the kiosk 102. Server 104 can format information such that business owners, managers or other authorized representatives of businesses can access each review that is being sent remotely can contain identifying information, such as the name or other ID of the guest. This enables the monitoring of feedback that is submitted remotely, and identifying, for example, false inputs. Upon identification of such false inputs, server 104 can notify business owners, managers or other authorized representatives.

In one or more implementations, the present application provides credit/ranking to registered users based on various criteria. For example, such criteria can include the volume of user inputs provided overall with regard to all businesses associated with the virtual guestbook system 100. In another example, such criteria can include responses to the registered user's user inputs. Such responses can include rebroadcasting user input, by "liking" or otherwise approving/confirming the user input, by indicating that particular user input was helpful, and/or by using a promotional code (e.g., representing a promotional offer) that is provided in the user input.

In addition to a lowest access level and a medium access level, a highest access level can be accredited to users. Users operating at the highest access level can be provided with an option to update business information, and/or access information and statistics that would be otherwise unavailable to other users.

In some embodiments, the virtual guestbook server can also collect metadata of searches based on user input, and other descriptive metadata that is attached to or associated with a user's experience. The metadata can be specific to a particular business, or can be related to many businesses within an industry and/or across industries. This metadata can be used to analyze trends and calibrate settings for a particular business, industry, location, use age group, demographic, etc. For example, someone searching on the internet for information relating to a particular business/industry type "A" (e.g., a provider of service or product), may use slightly different words in describing the relevant aspects of the business/industry than are actually indexed for that business/industry. For example, a teenager may use slang unfamiliar to an adult in describing a certain product or service, or an industry practitioner may use different language than a layman. In order to accommodate such concerns, the virtual guestbook can provide a tagging system which attaches tags to terminology for different industries, and can associate tags to terms used in the terminology usage for one industry with terms tagged in another industry. As such, the tagging system can help a user more easily find exactly the service or product they are looking for by suggesting services and products from a second industry whose tags are associated with a search term related to a first industry. Once the user finds the product or service they are looking for, they can provide the virtual guestbook with a geographic location to further narrow their search, or select online search. A list of business names can be provided, and users can browse search results based on the number of accredited inputs or which business has more inputs in general. The user can then request access to the business with the most informative virtual guestbook and read past experiences/reviews. Such users cannot comment, as they are not yet patrons of the business, but they may have the option for social experiences if they are ranked to do so, based on other interactions with the virtual guestbook system. And businesses who desire to do so can give other users the option to connect to that specific business to learn more about the business.

Thus, the present application provides an effective management of user input information received locally at businesses and/or remotely from various user computing devices. A form of viral marketing is introduced as a function of kiosk 102, server 104 and computing devices 106 that operate in connection with the teachings herein. In one or more implementations, a unique code can be generated that is associated with a particular transaction and/or the particular items purchased during a particular transaction. For example, such a unique code could be printed on the payment receipt provided to the user upon payment. The unique code can then be provided by the user at kiosk 102 and/or at a website maintained or provided by server 104. The code can enable the user to only review those items that the user purchased. By only allowing users to review purchases that they have actually made, the system ensures the authenticity of the user reviews that are submitted.

Similarly, such a unique code can be used to more generally review or rate an establishment (e.g., a store or restaurant). In this case, various aspects of the transaction (which can include a user's historical purchase information) can be used to appropriately weight the rating the user provides. For example, the rating provided by a user who orders a large meal at a restaurant can be weighted more significantly than the rating provided by a user who only ordered a cup of coffee. Similarly, ratings of regular customers can be weighted differently (either more or less, depending on the scenario) than ratings provided by one-time customers.

Moreover, user accounts can be maintained by the server 104, whereby recommendations can be generated and presented to a user based on previously submitted ratings (and/or ratings submitted by other users that have been determined to be similar). For example, based on a user's previously submitted ratings (e.g., restaurant A was too expensive, the service at restaurant B was too slow, the food at restaurant C was too greasy), the system can identify other products/establishments that may be attractive to the user. In doing so, not only are genuine reviews elicited, but the user is incentivized to provide accurate reviews, such that the future recommendations generated by the system are as accurate and appropriate as possible.

As referenced herein, the significance of ratings provided by others can be considered and weighted based on the user's own reviews. Thus, when a user retrieves a review page of a particular item or establishment, various user characteristics can be accounted for in computing the rating that is presented to the user. For example, it can be appreciated that certain establishments (e.g., restaurants) can be more attractive to one age group (e.g., teenagers) and less attractive to another (e.g., senior citizens). Thus, based on personal information (e.g., an age or age range) provided by a user, and/or previous reviews provided by a user (e.g., reviews that consistently correlate with the tastes of a teenager and/or senior citizen), the system can weigh the rating presented to the user, such that the final rating that is presented to the user is customized to the particular user (thus, two users may see different ratings for the same product or establishment). It should be understood that this 'personalized' rating can be in place of or in addition to an absolute, overall rating (which accounts for all ratings equally).

It should appreciated that the present application affords businesses with significant flexibility in connection with managing information received from guests, including to preclude negative feedback from being overly publicized and to take action in timely ways in response to negative (or positive) user input. Although businesses may want total control over management and dissemination of guest feedback, the present application is not so limited. In one or more implementations, user input information is stored and/or managed by kiosk 102 and/or server 104, and data management rules can be provided and implemented that preclude businesses from eliminating or otherwise preventing guest feedback from becoming public and/or disseminated. In this way, the present application protects freedom of speech for guests, for example, by ensuring that guests' speech (e.g., negative reviews and complaints) is not quashed by businesses.

Furthermore and in one or more implementations, business-use of user input that is received is monitored for compliance with data management rules. For example, a business can be permitted to prevent one out of every five negative customer reviews from being published in a virtual guestbook. If the business attempts to prevent more than one out of every five negative customer reviews from being published, then a message can be transmitted to the business that the negative reviews will be published in the virtual guestbook. Alternatively, the customer reviews may be automatically published without the businesses even being notified. In yet another alternative, access to a virtual guestbook may be removed by server 104, such as in cases of businesses repeatedly violating data management rules. Such data management rules can be enforced for the sake of the business, in order to ensure transparency and accuracy in connection with information being disseminated and one or more virtual guestbooks.

At this juncture, it should be noted that although much of the foregoing description has been directed to systems and methods for providing a virtual guestbook, the systems and methods disclosed herein can be similarly deployed and/or implemented in scenarios, situations, and settings far beyond the referenced scenarios. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product for providing a virtual guestbook. As shown and/or described herein, input received from guests can be received via kiosk 102, and received while the guest is on a business's premises. Further, guest activity, such as positive reviews, can be published almost immediately to one or more on-line social media networks. Negative reviews, on the other hand, can be filtered substantially automatically and transmitted to a customer service representative or other suitable person for further handling.

Flowcharts and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions describe herein can be implemented by hardware and or hardware executing code (also known as programs, software, or software applications) which include machine instructions for a programmable processor, and can be implemented in a high-level procedural and/or object-oriented programming language, and/or in assembly/machine language. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A method, comprising:

Accessing, by a computing device, a database that includes:
- electronic business information representing a plurality of respective businesses that sell products and/or services to customers;
- electronic customer information representing a plurality of respective customers that purchase the products and/or services from the respective businesses; and
- electronic feedback information representing submissions from the respective customers regarding experiences of the customers in connection with the respective businesses;

prompting, by the computing device and via a user interface, a customer to submit feedback information that comprises an input and a selection of a graphical element within the user interface associated with a business and a sale of a product associated with the business, including to associate a code with the sale;

receiving, by the computing device and in response to the prompt and by a kiosk device positioned at a defined location, the input and the selection of the graphical element within the user interface, wherein the kiosk device has a unique uniform resource locator ("URL") that can only be accessed from preapproved internet protocol ("IP") addresses that correspond to the defined location and is configured with one or more cameras and one or more microphones for receiving live input at a defined location;

integrating by the computing device the feedback information, including the input and the selection of the graphical element within the user interface, with a customer relation management ("CRM") application;

extracting, by the computing device from the input and using natural language processing, specific words within the feedback information by applying models that make probabilistic determinations to express a relative certainty of each of a plurality of possible meanings of the specific words within a context of the respective business's industry;

identifying by the computing device at least partially as a function of the received feedback information,
i) electronic customer information that represents the customer who submitted the feedback information; and
ii) a location where the feedback information was submitted;
iii) a quantity of feedback information related to the respective business's industry;

transmitting, by the computing device, the feedback information, to a bridge device customized in accordance with a configuration of the kiosk and configured to automatically broadcast inputs via one or more application programming interfaces ("APIs");

selecting by the computing device one of a plurality of respective computing devices, wherein the selecting is based on:

the customer who submitted the feedback information;
the location where the feedback information was submitted;
feedback information previously submitted by the customer and reviewed by other customers;
a determined experience of the customer; and
a highest relative certainty of the possible meanings of the extracted specific words; and
transmitting by the computing device the feedback information to the selected one respective computing device.

2. The method of claim 1, further comprising generating a quality score and determining a broadcast level that is based at least on the quality score.

3. The method of claim 2, wherein the broadcast level indicates at least one of:
providing the feedback information on a publicly accessible Internet website; and
providing the feedback information on one or more social networks.

4. The method of claim 3, further comprising providing the feedback information on one or more social networks, a smart blog, a server computing device and/or an Internet website.

5. The method of claim 1, wherein the graphical user interface comprises one or more of slider controls, drop-down lists, text box controls, checkboxes, and radio button controls.

6. The method of claim 1, further comprising categorizing the feedback information as a function of user activity associated with the feedback information.

7. The method of claim 6, wherein the user activity associated with the feedback information includes at least one of commenting on the feedback information, forwarding the feedback information, approving the feedback information, and redeeming the promotional offer.

8. The method of claim 1, further comprising compiling by the computing device the feedback information with other feedback information stored in the database and providing a rating of the business as a function of the compiled feedback information.

9. The method of claim 1, wherein the selecting is further based on other feedback information received from other users and related to the respective industry.

10. The method of claim 1, wherein the selecting is further based on filtering for negative feedback information.

11. A system, comprising:
a computing device operatively coupled to non-transitory processor readable media;
a database accessible by the computing device, the database including:
electronic business information representing a plurality of respective businesses that sell products and/or services to customers;
electronic customer information representing a plurality of respective customers that purchase the products and/or services from the respective businesses; and
electronic feedback information representing submissions from the respective customers regarding experiences of the customers in connection with the respective businesses;
the processor readable media having instructions for causing the computing device to perform operations comprising:
processing by the computing device information associated with a sale of a product and/or service from one of the respective businesses to a customer, including to associate a code with the sale;
prompting, by the computing device and via a user interface, a customer to submit feedback information that comprises an input and a selection of a graphical element within the user interface associated with a business and a sale of a product associated with the business, including to associate a code with the sale;
receiving, by the computing device in response to the prompt and by a kiosk device positioned at a defined location, the input and the selection of the graphical element within the user interface, wherein the kiosk device has a unique URL that can only be accessed from preapproved IP addresses that correspond to the defined location and is configured with one or more cameras and one or more microphones for receiving live input at a defined location;
integrating by the computing device the feedback information, including the input and the selection of the graphical element within the user interface, with a CRM application;
extracting, by the computing device from the input and using natural language processing, specific words within the feedback information by applying models that make probabilistic determinations to express a relative certainty of each of a plurality of possible meanings of the specific words within a context of the respective business's industry;
identifying, by the computing device and at least partially as a function of the feedback information,
   i) electronic customer information that represents the customer who submitted the feedback information; and
   ii) a location where the feedback information was submitted;
   iii) a quantity of feedback information related to the respective business's industry;
transmitting, by the computing device, the feedback information, to a bridge device customized in accordance with a configuration of the kiosk and configured to automatically broadcast inputs via one or more APIs;
selecting by the computing device one of a plurality of respective computing devices, wherein the selecting is based on:
the customer who submitted the feedback information;
the location where the feedback information was submitted;
feedback information previously submitted by the customer and reviewed by other customers;
a determined experience of the customer; and
the highest relative certainty of the possible meanings of the extracted specific words; and
transmitting by the computing device the feedback information to the selected one respective computing device.

12. The system of claim 11, wherein the processor readable media further have instructions for further generating a quality score and determining a broadcast level that is based at least on the quality score.

13. The system of claim 12, wherein the broadcast level indicates at least one of:
providing the feedback information on a publicly accessible Internet website; and
providing the feedback information on one or more social networks.

14. The system of claim 13, wherein the processor readable media further have instructions for causing the computing device to provide the feedback information on one or more social networks, a smart blog, a server computing device and/or an Internet website.

15. The system of claim 11, wherein the graphical user interface comprises one or more of slider controls, drop-down lists, text box controls, checkboxes, and radio button controls.

16. The system of claim 11, wherein the processor readable media further have instructions for causing the computing device to categorize the feedback information as a function of user activity associated with the feedback information.

17. The system of claim 16, wherein the user activity associated with the feedback information includes at least one of commenting on the feedback information, forwarding the feedback information, approving the feedback information, and redeeming the promotional offer.

18. The system of claim 11, wherein the processor readable media further have instructions for causing the computing device to compile the feedback information with other feedback information stored in the database and providing a rating of the business as a function of the compiled feedback information.

* * * * *